United States Patent [19]

Russo

[11] Patent Number: 4,608,964
[45] Date of Patent: Sep. 2, 1986

[54] TENSION SOLAR MIRROR

[75] Inventor: William P. Russo, Madison, N.J.

[73] Assignee: Foster Wheeler Energy Corporation, Livingston, N.J.

[21] Appl. No.: 671,679

[22] Filed: Nov. 15, 1984

[51] Int. Cl.<sup>4</sup> ................................................ F24J 2/10
[52] U.S. Cl. ..................................... 126/438; 350/608; 350/611
[58] Field of Search ................ 126/438; 350/611, 608, 350/607

[56] References Cited

U.S. PATENT DOCUMENTS

| | | |
|---|---|---|
| 3,574,447 | 4/1971 | Ruble .................................... 350/608 |
| 3,635,547 | 1/1972 | Rushing et al. ...................... 350/608 |
| 3,781,095 | 12/1973 | Rushing et al. ...................... 350/608 |
| 4,432,342 | 2/1984 | Lucas et al. ...................... 126/438 X |

Primary Examiner—Randall L. Green
Attorney, Agent, or Firm—Marvin A. Naigur; John E. Wilson; Warren B. Kice

[57] ABSTRACT

A tension solar mirror for a solar collector having a central collector tower is formed from a thin, concave-shaped sheet of fabric, or other flexible material, having a reflective surface on the concave side thereof. The sheet is supported by a plurality of cables attached to a like number of tension towers concentrically positioned the central receiver tower. Due to the action of gravity, the cables assume a natural concave shape that matches the concave shape of the reflective sheet. Further support for the sheet is provided by a small inner ring disposed about the central receiver tower and a larger outer ring near the tension towers. The inner ring is also used as a tie point for cable sections secured to the earth directly adjacent the base of the central tower. Both the cable sections tied to the inner ring and the cables attached to the tension towers are provided with winches, which are used both to raise and lower the tension solar mirror for installation or removal and to change the shape of the mirror.

12 Claims, 3 Drawing Figures

TENSION SOLAR MIRROR

BACKGROUND OF THE INVENTION

The invention relates to solar collector devices, and more particularly to mirrors or reflectors for such devices.

The efficient and economical generation of electrical energy from solar radiation has been one of the prime objectives of the energy industry in recent years. Both direct photovoltaic generation methods and indirect solar thermal methods have been used.

Solar thermal plants use one or more a reflecting surfaces to concentrate solar radiation onto a central receiver through which a working fluid, such as water, is circulated. The fluid is vaporized and the resulting fluid expansion is used to drive a turbine generator. The ideal reflecting surface for a solar thermal system is a parabolic mirror having the central receiver at its focal point. The mirror is also preferably movable in order to follow the sun across the sky. However, the production of such a movable, unitary mirror structure is very expensive, and due to mechanical support requirements such mirrors are limited in size.

As a compromise two primary alternative approaches have been used. The first uses multiple flat mirrors to direct the solar energy onto a central receiver. The mirrors are individually controlled so that they will concentrate the sun's radiation onto the collector throughout the day. The second approach uses an elongated trough having a parabolic cross-section to reflect the solar energy onto a collector which runs the length of the trough at the focus of the parabola. The trough is rotated along its longitudinal axis to follow the sun as it moves across the sky.

Both the multiple mirror and the parabolic trough are inherently less efficient than a single parabolic mirror. The multiple mirrors do provide a complete reflective surface and the flat mirrors collectively provide only a rough approximation of the ideal parabolic shape. The further difficulty and expense of controlling a large array of separate mirrors is also apparent. The parabolic trough suffers the inefficiency of being parabolic only in one dimension and thus does not provide optimum concentration of solar energy throughout the day.

It is therefore an object of the present invention to provide a solar collector mirror that is easy to install, maintain, and replace.

It is another object of the present invention to provide a solar collector mirror that is relatively inexpensive.

It is a further object of the present invention to provide a solar collector mirror whose shape and focal point can easily be altered.

It is yet another object of the present invention to provide a solar collector mirror which can be constructed in much larger sizes than present mirrors.

It is still another object of the present invention to provide a large solar collector mirror whose shape closely approximates the ideal reflector shape.

SUMMARY OF THE INVENTION

With these and other objects in view, the invention relates to a tension solar mirror including a plurality of towers forming a circular pattern. A cable extends from the top of each tower to the center of the circular pattern of towers where the cables are commonly attached, and a sheet of flexible material is attached to the cables. The sheet is formed into a concave shape and a reflective surface is provided on the concave side thereof. The cables thus form a concave shape under the action of gravity and thus impart the same concave shape to the reflective surface on the sheet.

In another aspect of the invention, the plurality of cables are commonly attached to a small inner ring sized to accomodate a central collector tower and a large perimeter ring attached to the outer edge of the sheet forming the reflector surface.

In a further aspect of the invention, means are provided for selectively altering the tension on the cables to permit altering the shape of the sheet forming the reflector surface in order to change the focal point of the collector.

BRIEF DESCRIPTION OF THE DRAWINGS

The invention may be more fully understood by reading the following description of a preferred embodiment thereof in conjunction with the appended drawings, wherein.

DESCRIPTION OF A PREFERRED EMBODIMENT

Figure 1:
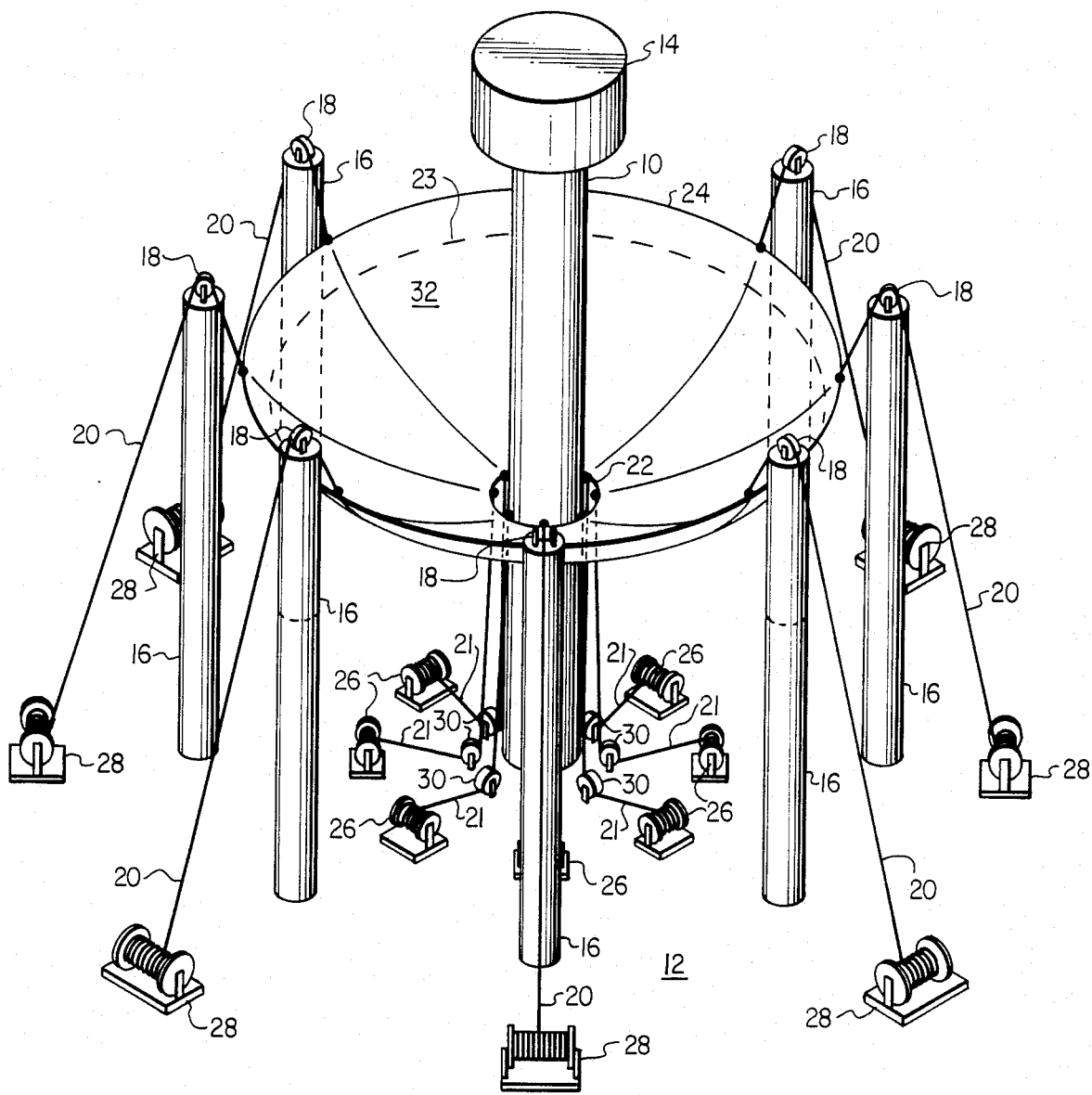
FIG. 1 is a perspective view of the tension solar mirror in use as part of a tower-type solar generator plant.

Referring to FIG. 1, a solar thermal plant includes a cylindrical central tower 10 affixed to the earth's surface 12 and having an enlarged cylindrical central receiver 14. Central receiver 14 is located at the focal point of the concave reflector to be described hereinafter. Disposed about central tower 10 is a plurality of tension towers 16 affixed to the earth's surface 12. Although eight such tension towers are shown (one is obscured by central tower 10 in FIG. 1), any suitable number could be used. Each tension tower 16 has affixed to the top thereof a sheave 18 for receiving a like number of cables 20.

Central tower 10 has disposed thereabout an inner ring 22, which is only slightly larger than the diameter of tower 10, and a perimeter or outer ring 24, which is substantially larger than inner ring 22 and slightly smaller in diameter than the diameter of an imaginary circle on which tension towers 16 lie. Rings 22 and 24 are suspended above the earth's surface 12 by means of cables 20. Cables 20 are attached to rings 22 and 24 by means of cable clamps, or the like (not shown). Additional rings, such as ring 23, may be concentrically positioned intermediate rings inner ring 22 and outer ring 24 to provide additional shaping and support.

Cables 20 are secured in position by means of a plurality of hoists 26 on one end thereof and a like number of hoists 28 attached to cable sections 21 of cables 20 on the other end thereof. Hoists 26 are positioned concentrically about tower 10 between tower 10 and tension towers 16 and are permanently secured to the earth's surface 12. Likewise hoists 28 are secured to the earth's surface 12 and are positioned concentrically with tower 10 outside the circle formed by tension towers 16. The cable system also includes a tension point for each cable section 21 near the base of tower 10 provided by sheaves 30, which are also permanently affixed to earth's surface 12. Sheaves 30 are positioned concentrically about tower 10 on an imaginary circle whose diameter is substantially the same as that of inner ring 22.

The portion of cables 20 between inner ring 22 and outer ring 24 is covered by a thin, high strength sheet of material 32 having a concave, preferably parabolic, shape. Sheet 32 can be made from cloth, plastic, or any other suitable flexible material. The top, or concave side of sheet 32 is coated with a reflective material, such as a thin veneer of aluminum foil. Sheet 32 may be made in sections and secured together by means of snaps, zippers, or the like (not shown), to permit easy installation about central tower 10 as well as convenient storage.

Figures 2, 3:
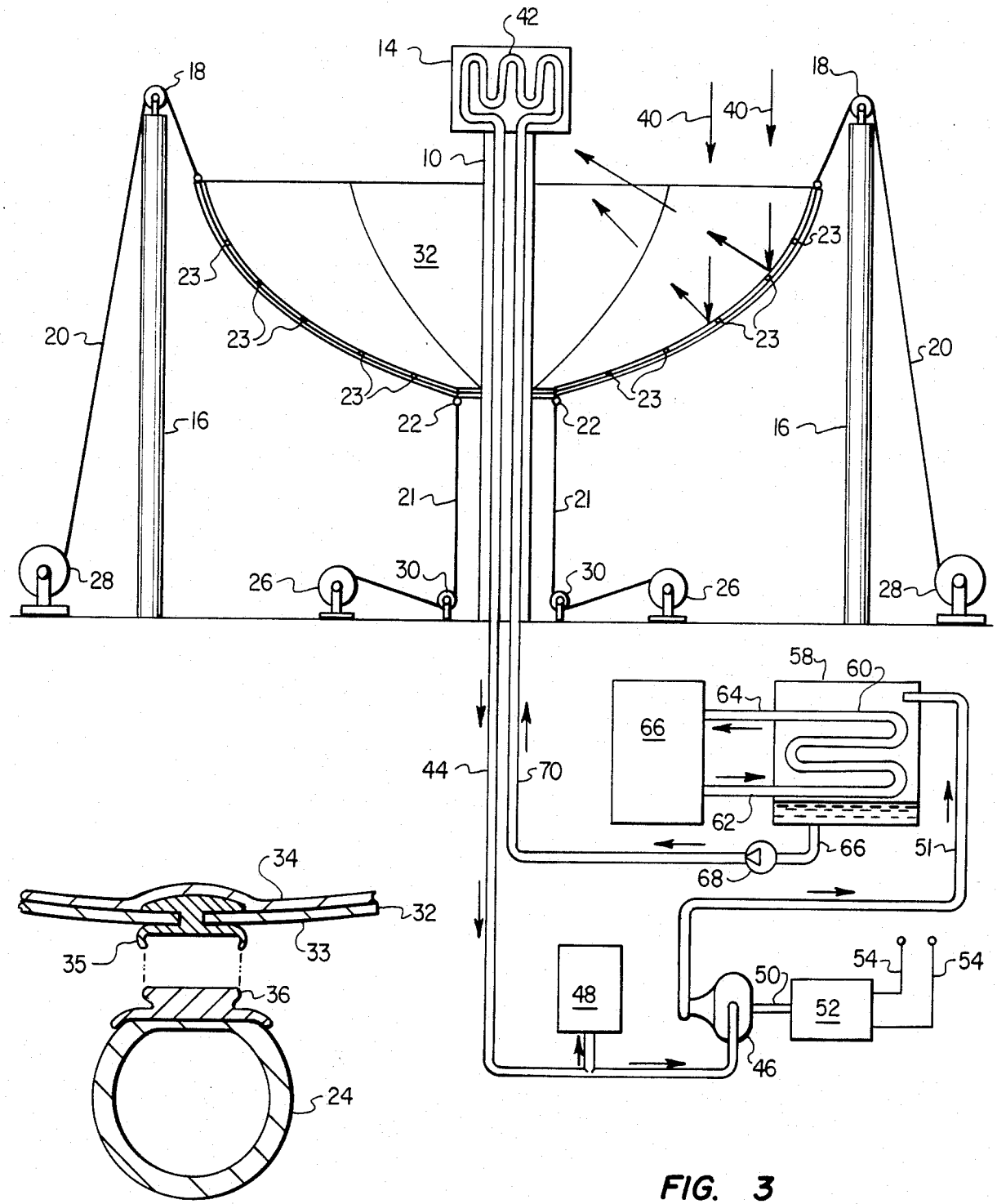
FIG. 2 is a detailed cross-section of a portion of the solar mirror of FIG. 1 illustrating one method of attaching the mirror reflector to the mirror framework.
FIG. 3 is an elevational cross-section of the tension solar mirror and solar generator plant of FIG. 1 illustrating the process of collecting solar energy and generating electricity therefrom.

Referring next to FIG. 2, sheet 32, which comprises the reflecting surface of the tension solar mirror, may be comprised of a base layer 33 and a reflective layer 34 secured to base layer 33. Sheet 34 may be attached to perimeter ring 24 by means of a snap connector comprising a female upper section 35, which has a base portion secured between base layer 33 and reflective coating 34, and a male lower section 36 which is secured to perimeter ring 24. It should be understood that similar snap connections may be made between sheet 32 and internal ring 22 or intermediate rings 23. It should also be noted that the snap connectors are merely illustrative and that other suitable connector devices might also be used. Similar connector devices may be used to secure the previously-mentioned sheet sections together.

Referring next to FIG. 3, the interior of central receiver 14 contains a heat transfer network 42 consisting of a coiled section of conduit for carrying a heat transfer fluid, such as water. Heat transfer network 42 is connected by means of conduit 44, which passes through central tower 10, to a steam turbine 46. Conduit 44 is also connected in parallel to a steam storage tank 48. Turbine 46 is connected, via a rotatable shaft 50, to an electrical generator 52, which supplies an electrical transmission system through electrical lines 54.

The outlet of turbine 46 is connected, via a conduit 56, to the inlet of a condenser tank 58. Condenser tank 58 has situated therein a heat transfer network 60 comprising a coiled conduit whose inlet 62 and outlet 64 pass through the wall of condenser tank 58 to a cooling tower 66. The outlet of condenser tank 58 is connected via conduit 66 to a pump 68. The pump 68 is then connected by means of a conduit 70, which passes through central tower 10, to heat transfer network 42.

In operation, the solar tension mirror is prepared for use as illustrated in FIG. 1 by de-tensioning cables 20 such that they are lying on the surface of the earth or are suspended at a convenient working height. Sheet 32 is then positioned about central tower 10 with the concave reflective surface positioned upwardly, and the one or more sections of sheet 32 are secured together by means of snaps 35/36 (FIG. 2). Sheet 32 is also secured to rings 22, 23, and 24 by snaps, or the like. Winches 28 are then actuated to raise cables 20 and the associated rings 22, 23, and 24 above the earth's surface to their operating height. Winches 26 are also actuated to tension cable sections 21 and thus form a rigid concave shape in sheet 32. The concavity of sheet 32 can be controlled by adjusting the tension in cables 20 and cable sections 21, and the location of the focal point can be altered by selective adjustment of the tension in each cable 20 and cable section 21.

When the solar tension mirror has been rigged for use, collection and conversion of solar energy begins (FIG. 3). Solar radiation from the sun, as illustrated by arrows 40, strikes the surface of sheet 32 and is reflected onto central receiver 14. Due to the concave shape of sheet 10, solar energy striking sheet at all points on the surface thereof is concentrated at central receiver 14, which creates extremely high temperatures at that point.

A heat absorption fluid, such as water, is circulated by means of pump 68 via conduit 70 through heat transfer network 42, which absorbs the solar radiation and is changed to steam. The steam thus formed passes via conduit 44 to steam turbine 46. Excess steam is stored in tank 48 and is used to operate turbine 46 well after the sun has progressed to the point in the sky that it no longer heats central receiver 14. The steam causes turbine 46 to rotate shaft 50, which operates electrical generator 52. The resulting electrical power is distributed via electrical line 54.

The steam exiting from turbine 46 passes via conduit 56 into condenser 58. Cooling water circulating from cooling tower 66 into condenser 58 through inlet conduit 62 and back into cooling tower 66 through outlet conduit 64 removes heat from the steam, thereby causing it to return to the liquid phase. The water then passes from condenser 58 via conduit 66, from whence it is recirculated by pump 68.

The tension solar mirror may be disassembled for repair, cleaning, or storage by reversing winches 28 to lower sheet 32 to the surface of the earth. Winches 26 are also concurrently reversed to take up slack in cable sections 21. When sheet 32 reaches the earth's surface, it is disassembled by disengaging snaps 35/36 (FIG. 2).

It should be understood that the tension solar mirror hereinabove may be constructed using variations not specifically depicted in the drawings. For example, the number of cables 20 and tension posts 16 may be increased as necessary to gain more accurate control over the shape of the mirror surface. Also the portions of cable 20 between rings 22, 23, and 24 might be supported with a multiplicity of separate rigid ribs formed into a parabolic shape. Such ribs could be used to provide the more nearly parabolic shape to the mirror surface required for best focus of the solar energy upon central receiver 14. Further, the central tower 10 and tension towers 16 might be mounted on a movable structure in order that the tension solar mirror can be moved to follow the sun across the sky.

While particular embodiments of the invention have been shown and described, it is obvious that minor changes and modifications may be made therein without departing from the true scope and spirit of the invention. It is the intention in the appended claims to include all such changes and modifications.

What is claimed is:

1. A solar collector comprising a central tower having a solar receiver thereon; a plurality of tension towers positioned concentrically about the central tower; a rigid inner ring disposed about said central tower and sized to permit vertical movement relative to said central tower; a plurality of cables extending between the inner ring and the tops of each of the tension towers; and a reflectively-coated sheet of flexible material attached to the upper surface of said of cables; whereby the action of gravity on said cables and said sheet form a concave reflector for focusing solar energy onto the solar receiver.

2. A solar collector in accordance with claim 1 further including means for selectively altering the tension on said cables, whereby the shape of said sheet can be altered to change the focal point of said collector.

3. A solar collector in accordance with claim 2 further including a rigid outer ring attached to said cables adjacent said tension towers for supporting the edge of said sheet.

4. A solar collector in accordance with claim 3 further including a plurality of rigid concentric rings attached to said cables intermediate said inner ring and said outer ring.

5. A solar collector in accordance with claim 2 wherein said means for altering the tension in said cables comprises a first plurality of winches secured to the surface of the earth outwardly of said tension towers and attached to the ends of said cables; and a sheave mounted on each of said tension towers for receiving said cables.

6. A solar collector in accordance with claim 5 wherein said means for altering the tension in said cables further comprises a second plurality of winches secured to the surface of the earth adjacent said central tower; and a like number of cable sections attached between said winches and said inner ring.

7. A solar mirror comprising a plurality of towers forming a circular pattern; a plurality of cables extending from the top of said towers, respectively to the center of the circular pattern of towers, means for securing said cables relative to said center, said cables forming a concave shape under the action of gravity; and a sheet of flexible material attached to said cables and having a reflective surface on one side thereof, said sheet being formed into a concave shape on the reflective side thereof.

8. A tension solar mirror in accordance with claim 7 further including means for adjusting the tension in said cables to chnge the degree of concavity of said sheet.

9. A tension solar mirror in accordance with claim 8 wherein said means for adjusting the tension in said cables may be selectively actuated to alter the focal point of said mirror.

10. A tension solar mirror in accordance with claim 9 wherein said cables are commonly attached to the periphery of a rigid inner ring extending around said center of said circular pattern, said ring being sized to receive a central solar collector tower.

11. A tension solar mirror in accordance with claim 10 wherein said means for adjusting the tension comprises a winch adjacent each of said towers and attached to the end of one of said cables; a plurality of cable sections attached to said inner ring about the periphery thereof; and a winch attached to each cable section and secured to the earth's surface directly under said inner ring.

12. A tension solar mirror in accordance with claim 11 wherein said winches associated with said towers are secured to the earth's surface exteriorly of said circular pattern of towers and each of said towers has a sheave on the top thereof for receiving said cable.

* * * * *